United States Patent [19]

Nagano

[11] Patent Number: 5,073,151
[45] Date of Patent: Dec. 17, 1991

[54] MULTI-SPEED SPROCKET ASSEMBLY FOR BICYCLE

[75] Inventor: Masashi Nagano, Osaka, Japan

[73] Assignee: Shimano Industrial Co., Ltd., Osaka, Japan

[21] Appl. No.: 428,777

[22] Filed: Oct. 30, 1989

[30] Foreign Application Priority Data

Nov. 7, 1988 [JP] Japan .................. 63-281064

[51] Int. Cl.⁵ .............................. F16H 55/30
[52] U.S. Cl. .................... 474/160; 474/164
[58] Field of Search .............. 474/151–153, 474/155–158, 160–162, 164; 74/457, 467

[56] References Cited

U.S. PATENT DOCUMENTS

| | | |
|---|---|---|
| 3,478,614 | 11/1969 | Shimano .............. 474/160 |
| 4,268,259 | 5/1981 | Segawa et al. ........ 474/160 |
| 4,348,200 | 9/1982 | Terada .............. 474/160 |
| 4,773,893 | 9/1988 | Su et al. ............ 474/152 |

FOREIGN PATENT DOCUMENTS

| | | |
|---|---|---|
| 0021839 | 1/1981 | European Pat. Off. . |
| 3037857 | 4/1981 | Fed. Rep. of Germany . |
| 2469624 | 5/1981 | France . |
| 2532710 | 3/1984 | France . |
| 475021 | 11/1937 | United Kingdom . |

Primary Examiner—Ramon S. Britts
Assistant Examiner—Roger J. Schoeppel
Attorney, Agent, or Firm—Dickstein, Shapiro & Morin

[57] ABSTRACT

In a multi-speed sprocket assembly for a bicycle having at least one large sprocket with teeth and one small sprocket with teeth disposed adjacent each other and selectively engageable with a drive chain of the bicycle consisting of a series of pivotably connected link plates, the improvement includes a chain receiving portion formed on a reference tooth of the large sprocket so as to receive a connecting portion of the link plates with diametrical clearance from a tooth space bottom of the large sprocket. The teeth of the small sprocket have such phase relationship relative to the chain receiving portion of the large sprocket that a tooth of the small sprocket positioned downstream relative to the reference tooth engages with the chain when the connecting portion of the chain is received by the chain receiving portion of the reference tooth. A cutout portion for preventing interference with the link plates is provided to a tooth of the small sprocket positioned within a path of the link plates of a chain portion positioned more upstream than a chain portion engaging the small sprocket and moving to the chain receiving portion. With the improvement, the chain shifting operation from small to large sprockets can be effected smoothly yet reliably.

10 Claims, 2 Drawing Sheets

MULTI-SPEED SPROCKET ASSEMBLY FOR BICYCLE

BACKGROUND OF THE INVENTION

1. Field of the Invention

The present invention relates to a multi-speed sprocket assembly for a bicycle, and more particularly to a multi-speed sprocket assembly of the above type including at least one large sprocket with teeth and one small sprocket with teeth disposed adjacent each other and selectively engageable with a drive chain of the bicycle consisting of a looped series of pivotably connected link plates.

2. Description of the Prior Art

A typical multi-speed sprocket assembly of the above-described type is known from a Japanese published utility model gazette No. 55-28617. In this sprocket assembly, in order to provide good chain engaging performance, the large sprocket and the small sprocket disposed adjacent thereto are arranged so that a central point between an adjacent pair of teeth of the large sprocket is positioned on a tangential line extending from a central point between an adjacent pair of teeth of the small sprocket with a distance between the central points being an integer multiple of a pitch of the driver chain.

For effecting a change-speed operation by shifting the drive chain from one sprocket to another, a portion of the chain postioned on an upstream side of the sprocket assembly relative to a rotational drive direction of the same is pushed by a derailleur device in a rotational axis direction of the sprocket assembly. With the above conventional construction, if the small sprocket is significantly smaller in diameter than the large sprocket, when a chain portion positioned more upstream than a chain portion currently engaging with the small sprocket is shifted toward the large sprocket, most of this chain portion moving toward the large sprocket is already disengaged from the teeth of the small sprocket, whereby the chain shifting operation can take place smoothly without being interferred by trailing engagement with the small sprocket.

However, in the case of the above conventional construction, if the diameter difference between the small sprocket and the large sprocket is rather small, namely, if the difference in the numbers of gears between these sprockets is small, most of the leading chain portion, i.e. the chain portion to be first shifted onto the large sprocket is still engaged with the teeth of the small sprocket, such that the remaining engagement with the small sprocket tends to interfere with the chain shifting movement to the large sprocket. Accordingly, the leading chain portion first rides onto a tooth edge of the small sprocket and then comes into engagement with a leading tooth of the large sprocket.

Taking the above-described state of the art into consideration, the primary object of the present invention is to provide a multi-speed sprocket assembly for a bicycle which permits smooth change speed operation by shifting a drive chain from a small sprocket to a large sprocket even if a diameter difference between the small and large sprockets is rather small.

SUMMARY OF THE INVENTION

In order to accomplish the above-noted object, a multi-speed sprocket assembly for a bicycle, according to the present invention, having at least one large sprocket with teeth and one small sprocket with teeth disposed adjacent each other and selectively engageable with a drive chain of the bicycle consisting of a looped series of pivotably connected link plates, the invention is characterized by a chain receiving portion formed on a reference tooth of the teeth of the large sprocket so as to receive a connecting portion of the link plates with diametrical clearance from a tooth space bottom of the large sprocket, the teeth of the small sprocket being arranged with such phase relationship relative to the chain receiving portion of the reference tooth of the large sprocket that a tooth of the small sprocket positioned downstream relative to the reference tooth engages with the chain when the connecting portion of the chain is received by the chain receiving portion of the reference tooth of the large sprocket, and a cutout portion for preventing interference with the link plates, the cutout portion being provided to a tooth of the small sprocket positioned within a path of the link plates of a chain portion postioned more upstream relative to the rotational drive direction than a further chain portion currently engaging with the small sprocket and moving to the chain receiving portion.

According to the above-described characterizing features of the invention, as illustrated in FIGS. 1 and 3, the teeth of the small sprocket 2 are arranged with such phase relationship relative to the chain receiving portion 12 of the reference tooth 11 of the large sprocket 1 that a tooth of the small sprocket 2 positioned downstream relative to the reference tooth 11 engages with the chain 3 when the connecting portion 35 of the chain 3 is received by the chain receiving portion 12 of the reference tooth 11 of the large sprocket 1. Accordingly, when a portion of the chain 3 positioned upstream relative to a chain portion engaging with the small sprocket 2 is to be shifted onto the large sprocket 1, the chain receiving portion 12 of the large sprocket 1 can receive the connecting portion 35 of this chain portion 3 being shifted to the large sprocket 1.

In addition, because the cutout portion 22 for preventing interference with the link plates is provided to a tooth of the small sprocket 2 positioned within a path of the link plates of a chain portion positioned more upstream relative to the rotational drive direction than a further chain portion currently engageing with the small sprocket and moving to the chain receiving portion 12, the chain shifting operation from the small sprocket to the large sprocket can be effected smoothly without being inteferred by the teeth of the small sprocket even if these large and small sprockets have only slight diameter difference therebetween.

Furthermore, the chain receiving portion 12 is formed on the reference tooth 11 of the large sprocket 1 so as to receive a connecting portion of the link plates with diametrical clearance from a tooth space bottom of the large sprocket. Therefore, the leading chain portion can be sufficiently lifted up (in the diametrical direction) from the tooth bottom of the small sprocket 2. Accordingly, it is possible to minimize reduction in the engaging amount of the small sprocket 2 which is inevitable with the formation of the cutout portion 22, and this small sprocket 2 can reliably and sufficiently engage with the chain in spite of the cutout portion 22.

As described above, the present invention has fully achieved its object of providing a multi-speed sprocket assembly for a bicycle which permits smooth change speed operation by shifting a drive chain from a small sprocket to a large sprocket even if a diameter difference between the small and large sprockets is rather small.

Further and other objects, features and effects of the invention will become apparent from the following more detailed description of the embodiments of the invention with reference to the accompanying drawings.

BRIEF DESCRIPTION OF THE DRAWINGS

FIGS. 1 through 5 illustrate preferred embodiments of a multi-speed sprocket assembly for a bicycle relating to the present invention; in which, FIG. 1 is a partially cutout front view, FIG. 2 is a front view of major portions, FIG. 3 is a view illustrating a chain shifting operation, FIG. 4 is a schematic view of a drive system of the bicycle, and FIG. 5 is a front view of major portions of a modified sprocket assembly.

DESCRIPTION OF THE PREFERRED EMBODIMENTS

Preferred embodiments of the present invention will be particularly described next with reference to the accompanying drawings.

Figure 1:
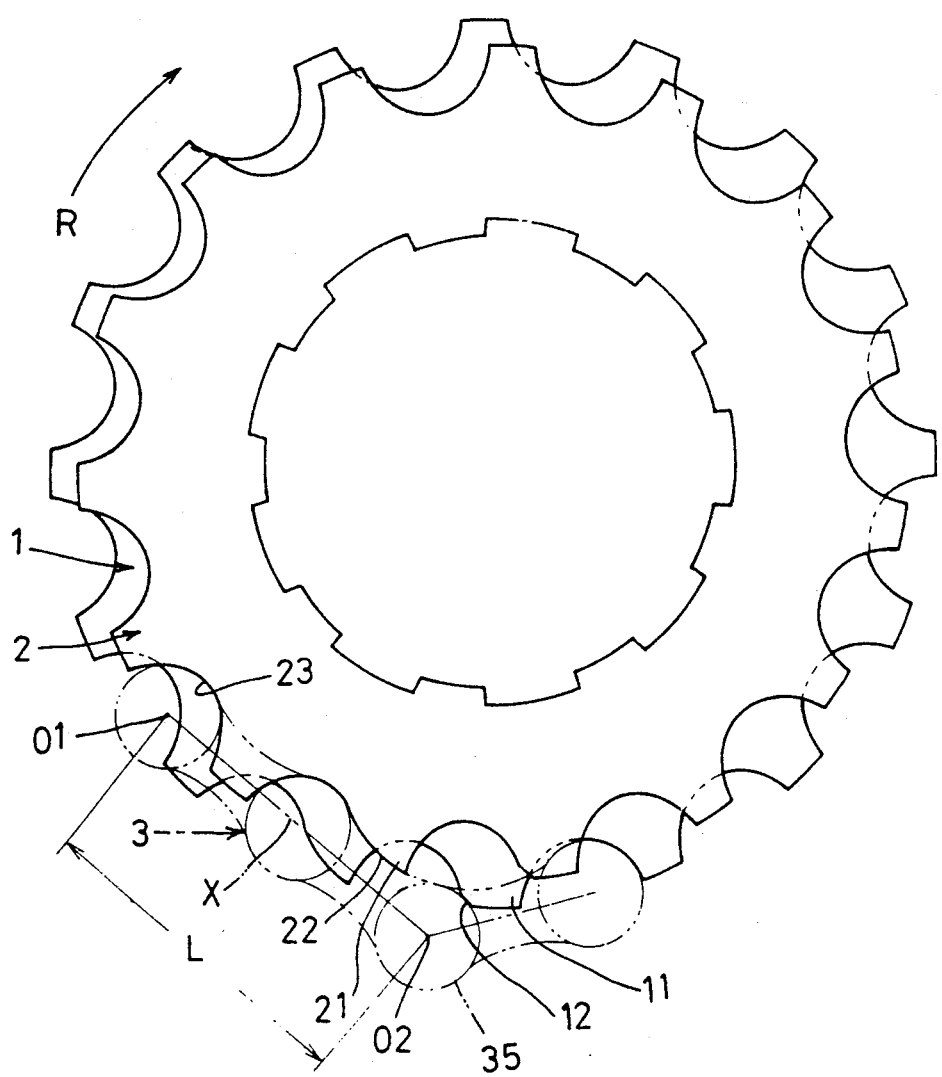
Figure 2:
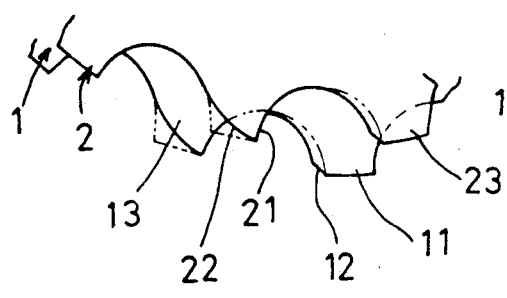
Figure 4:
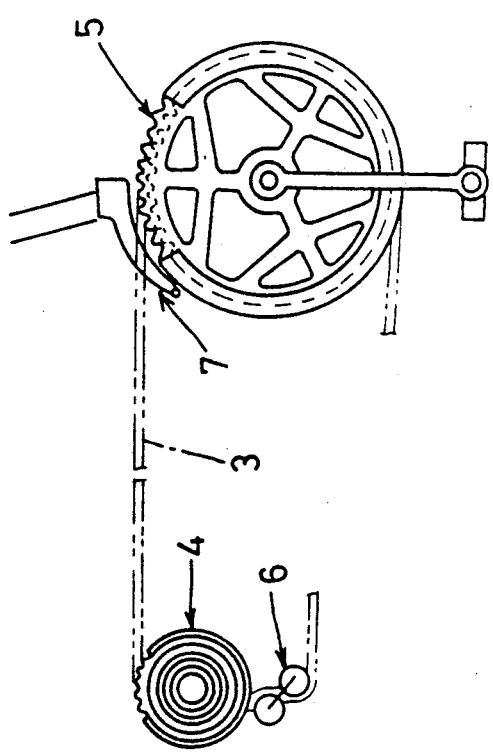

A multi-sprocket assembly of FIGS. 1 and 2 constitutes part of a rear sprocket assembly 4 to be attached to a rear wheel hub of a bicycle, as illustrated in FIG. 4. The rear sprocket assembly 4 includes six to seven sprockets; whereas the sprocket assembly of FIGS. 1 and 2 includes only two sprockets which are disposed adjacent each other and intermediately of the assembly 4; namely, a large sprocket 1 having sixteen gear teeth and a small sprocket 2 having fifteen gear teeth. These sprockets 1 and 2 are attached to an unillustrated drive element with a distance therebetween in a direction of a common rotational axis and are further rotatably supported via a bearing on a driven element of the rear wheel hub.

On the other hand, as shown in FIG. 4 a front multi-speed sprocket assembly 5 including two sprockets of different diameters is attached to a crank device of the bicycle. Then, a drive chain 3 is entrained between and on the sprocket assemblies 4 and 5. Further, a rear derailleur 6 and a front derailleur 7 are provided for shifting the chain 3 between sprockets of the assemblies 4 and 5 along the axes thereof, respectively for effecting a change speed operation.

The drive chain 3 is a looped series consisting of a plurality of groups of a pair of inner link plates 31 and 31 and a pair of outer link plates 32 and 32 connected to each other via a connecting pin 34 rotatably supporting a roller 33 thereabout. Opposed ends respectively of the connecting pin 34, the roller 33 and of the link plates 31, 32 together constitute a connecting portion 35 of the roller chain 3. The rear and front multi-speed sprocket assemblies 4 and 5 are rotated in unison in a rotational drive direction, which is the clockwise direction in FIG. 4 or a direction denoted by an arrow R in FIGS. 1 and 3, to transmit propelling power for the bicycle.

Referring back to FIG. 1, a distance between an adjacent pair of teeth on a pitch circle respectively of the large and small sprockets 1 and 2 is formed longer than an outer diameter of the roller 33 of the chain 3, which difference provides a predetermined clearance between the side faces of the teeth pair and the roller 33. Further description of this particular embodiment will be provided by taking the rear multi-speed sprocket assembly 4 for example.

As shown in FIGS. 1 and 2, a reference tooth 11 of the large sprocket 1 has a tooth width greater than those of the other teeth of the same within the limit defined by the above-described clearance. This reference tooth 11 has one angular edge, i.e. the edge positioned downstream relative to the rotational drive direction, cutout to form a chain receiving portion 12. And, this chain receiving portion 12 is formed as an inclined face substantially parallel to a center line X of the chain 3 to be shifted from the small sprocket 2 to the large sprocket 1.

Figure 3:
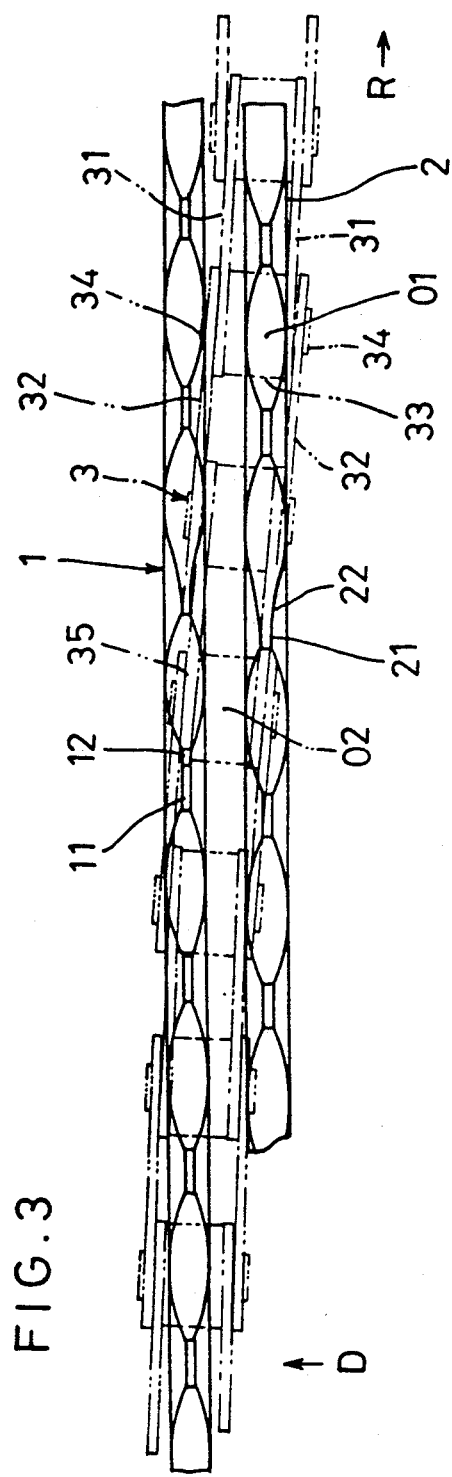

Further, as shown in FIGS. 1 and 3, the teeth of the small sprocket 2 are arranged with such phase relationship relative to the chain receiving portion 12 of the reference tooth 11 of the large sprocket 1 that a tooth of the small sprocket 2 positioned downstream relative to the reference tooth 11 engages with the chain 3 when the connecting portion 35 of the chain 3 is received by the chain receiving portion 12 of the reference tooth 11 of the large sprocket 1. Referring more particularly to this phase relationship of the teeth of the small sprocket 2, if a center of the connecting portion 35 engaging with a tooth space at a second position from a tooth space of the small sprocket 2 corresponding to the reference tooth 11 is defined as a first center $O_1$, and if a center of the connecting portion 35 as received by the chain receiving portion 12 is defined as a second center $O_2$, then, a center line X extending between the first center $O_1$ and the second center $O_2$ has a length substantially equating with a distance L which is an integer multiple of a pitch between an adjacent pair of connecting portions 35 of the chain 3. Accordingly, when a portion of the chain 3 positioned upstream relative to a chain portion engageing with the small sprocket 2 is to be shifted onto the large sprocket 1, the chain receiving portion 12 of the large sprocket 1 can receive the connecting portion 35 of this chain portion 3 being shifted to the large sprocket 1.

A tooth 21 of the small sprocket 2 positioned within a moving path of the link plates 31 and 32 of the chain 3 being shifted to the large sprocket 1, includes a cutout portion 22 for preventing interference with the link plates 31 and 32. Preferably, as illustrated in FIG. 1, this cutout portion 22 is so formed as to correspond to the shape of the chain 3 on the moving path, such that the chain portion 3 on the moving path to the large sprocket 1 can be received by both the chain receiving portion 12 and the cutout portion 22, for advantageously preventing diametrical displacement of the chain 3 relative to the sprocket assembly. With this improved chain running stability, it becomes even easier to engage the link plates 31 and 32 positioned upstream relative to the connecting portion 35 received by the chain receiving portion 12 with a tooth of the large sprocket 1 positioned upstreamly adjacent the reference tooth 11.

Preferably, all but the smallest of the six or seven sprockets of the assembly 4 have the reference tooth 11 and its chain receiving portion 12, while the smallest sprocket has the cutout portion 22. As shown in FIG. 2, the large sprocket 1 includes a tooth 13 having its downstream-side edge cutout to form the cutout portion for the still larger sprocket (not shown) which is adjacent thereto; whereas the small sprocket 2 includes a tooth 23 as the reference tooth having the cutout portion for the still smaller sprocket (not shown) which is adjacent thereto.

Next, engaging and disengaging conditions between the drive chain 3 and the sprockets 1 and 2 in a chain shifting operation using the rear derailluer will be particularly described with reference to FIGS. 1, 3 and 4.

For shifting the chain 3 from the small sprocket 2 to the large sprocket 1 by moving a movable element of the rear derailleur of FIG. 4 in a direction of arrow D in FIG. 3, a portion of the chain 3 on the rear derailleur side, i.e. the chain portion currently positioned upstream relative to the small sprocket 2 to come into engagement with the same, is most displaced towards the large sprocket 1 at the position of the tooth 21 having the cutout portion 22, thus, the chain shifting operation starts at this position.

As shown in FIG. 3, when the chain 3 is shifted, the sprockets 1, 2 and the chain 3 advance in the direction R with part of the chain 3 (the part to the left of FIG. 3) being engaged with the large sprocket 1 while another part of the chain 3 (the part to the right of FIG. 3) being engaged with the small sprocket 2. Consequently, the part of the chain 3 which is engaged with the small sprocket 2 disengages from the small sprocket 2 and is engaged only with the large sprocket 1.

In the above chain shifting operation, since the chain receiving portion 12 formed on the reference tooth 11 of the large sprocket 1 is provided with the phase relationship relative to the leading tooth of the small sprocket 2 predetermined on the basis of the chain pitch as described hereinbefore, the chain receiving portion 12 can reliably receive one connecting portion 35 of the chain 3 being pressed toward the large sprocket 3, as best shown in FIG. 1. Then, in this condition, a roller 33 of the further connecting portion upstreamly adjacent the connecting portion 35 received by the chain receiving portion 12 can reliably fit into a tooth space upstreamly adjacent the reference tooth 11.

Moreover, since the cutout portion 22 effectively prevents interference between the chain 3 and the small sprocket 2, the above shifting operation of the chain 3 onto the large sprocket 1 can take place still more smoothly. In this way, with the multi-speed sprocket assembly of the present invention, a chain shifting operation from the small sprocket 2 to the large sprocket 1 can be effected speedily and reliably, whereby the change-speed efficiency of the sprocket-derailleur combination has been improved significantly.

Some alternate embodiments of the invention will be specifially described next.

I. In the foregoing embodiment, the chain receiving portion 12 is formed as an inclined face extending substantially parallel to the center line of the chain portion being shifted from the small sprocket 2 to the large sprocket 1. Instead, this chain receiving portion 12 can be formed as an arcuate face corresponding to the outer diameter of the connecting portion 35 of the chain 3.

Figure 5:
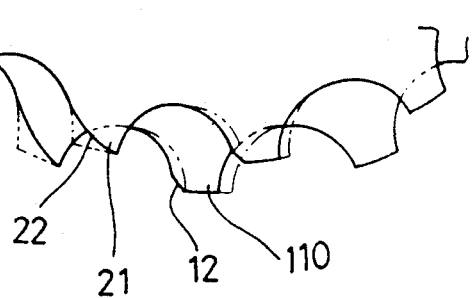

II. The reference tooth 11 having the chain receiving portion 12 need not have a greater gear width than the other teeth of the large sprocket 1 and can have the same gear width as the other teeth. In this case, the chain receiving portion 12 will be formed with or without cutoff of the downstream-side tooth edge of the reference tooth 11. Further, as shown in FIG. 5, it is also conceivable to downstreamwise displace a reference tooth 110 within a limit defined by a predetermined width clearance formed between the tooth 110 and the roller 33.

III. In the foregoing embodiment, the large sprocket 1 and the small sprocket 2 have sixteen and fifteen teeth, respectively. Alternately, it is conceivable to embody the present invention by a different combination of sprockets, such as a combination of 13-tooth small sprocket and 15-tooth large sprocket or 16-tooth small sprocket and 19-tooth large sprocket.

IV. The multi-sprocket assembly of the invention can be used as the front sprocket assembly 5.

V. In the foregoing embodiment, the cutout portion 22 is so formed as to correspond to the moving path of the chain portion 3 on its way to the large sprocket 1 as illustrated in FIG. 1. Instead, this cutout portion 22 can be formed straight and parallel to the aforementioned center line X. Further, it is also conceivable to provide clearance between the cut face of the cutout portion 22 and the chain portion on the moving path.

VI. The cutout portion 22 need not be formed by uniform cutting of a tooth portion along the direction of face width. That is, this cutout portion 22 achieves its distinguished effect as long as the cutout absence of the edge is large enough to reliably prevent interference between the small sprocket 2 and the link plates 31 and 32 of the chain 3 on its way to the large sprocket 1.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A multi-speed sprocket assembly for a bicycle having at least one large sprocket with teeth and one small sprocket with teeth disposed adjacent each other and selectively engageable with a drive chain of the bicycle comprising a looped series of pivotably connected link plates, said sprocket assembly comprising:

a chain lifting-receiving portion formed on a reference tooth of the teeth of the large sprocket so as to lift to receive a connecting portion of the link plates with diametrical clearance from a tooth bottom of the large sprocket;

the teeth of said small sprocket being arranged with such phase relationship relative to said chain lifting-receiving portion of the reference tooth of the large sprocket such that a tooth of said small sprocket positioned downstream in a rotational drive direction relative to said reference tooth engages with the chain when said connecting portion of the chain is received by said chain lifting-receiving portion of the reference tooth of the large sprocket;

a cutout portion for preventing interference between said link plates and said small sprocket, said cutout portion being provided on a tooth of said small sprocket positioned within a path of the link plates of a chain portion positioned more upstream relative to said rotational drive direction than a further chain portion currently engaging with said small sprocket when said upstream chain portion moves to said chain lifting-receiving portion.

2. A multi-speed sprocket assembly as defined in claim 15, wherein said chain lifting-receiving portion is formed at an angular edge of said reference tooth positioned downstream relative to the rotational drive direction.

3. A multi-speed sprocket assembly as defined in claim 2, wherein said chain lifting-receiving portion is a small face formed substantially parallel to a center line of the chain in the course of a shifting operation thereof.

4. A multi-speed sprocket assembly as defined in claim 3, wherein said cutout portion is formed substantially along a moving track of the link plates.

5. A multi-speed sprocket assembly as defined in claim 4, wherein clearance in said rotational drive direction is provided between the teeth of said large sprocket and said chain, said reference tooth having an increased width downstream relative to said rotational drive direction.

6. A multi-speed sprocket assembly as defined in claim 4, wherein clearance in said rotational drive direction is provided between the teeth of said large sprocket and said chain, said reference tooth being displaced downstream relative to said rotational drive direction.

7. A multi-speed sprocket assembly as defined in claim 5, wherein said sprocket assembly is used as a rear sprocket assembly.

8. A multi-speed sprocket assembly as defined in claim 1, wherein said chain lifting-receiving portion when receiving said chain connecting portion is engageable with a tooth bottom of a tooth of the large sprocket positioned upstream adjacent said tooth having the chain lifting-receiving portion relative to said rotational drive direction.

9. A multi-speed sprocket assembly as defined in claim 1, wherein said cutout portion extends across the width of the tooth of said small sprocket positioned more upstream relative to said rotational drive direction than a further chain portion currently engaging with said small sprocket when said upstream chain portion moves to said chain lifting-receiving portion.

10. A multi-speed sprocket assembly as defined in claim 6, wherein said sprocket assembly is used as a rear sprocket assembly.

* * * * *